United States Patent [19]
Caputo et al.

[11] 3,770,948
[45] Nov. 6, 1973

[54] DATA HANDLING SYSTEM MAINTENANCE ARRANGEMENT

[75] Inventors: James P. Caputo, Chicago, Ill.; Robert J. Chybowski, Oak Creek, Wis.; Phil R. Harrington, Mt. Prospect, Ill.

[73] Assignee: GTE Automatic Electric Laboratories Incorporated, Northlake, Ill.

[22] Filed: May 26, 1972

[21] Appl. No.: 257,125

[52] U.S. Cl. .......................................... 235/153 AE
[51] Int. Cl. .......................................... G06f 15/16
[58] Field of Search .............................. 235/153 AE; 340/146.1 BE; 179/15 AE, 15 BF

[56] References Cited

UNITED STATES PATENTS

| | | | |
|---|---|---|---|
| 2,950,464 | 8/1960 | Hinton et al. | 340/146.1 BE |
| 3,509,532 | 4/1970 | Vande Wege | 340/146.1 BE |
| 3,517,174 | 6/1970 | Ossfeldt | 235/153 AE |
| 3,585,307 | 6/1971 | Greenberg | 179/15 BF |
| 3,624,372 | 11/1971 | Philip et al. | 340/146.1 BE |

*Primary Examiner*—Charles E. Atkinson
*Attorney*—K. Mullerheim et al.

[57] ABSTRACT

A switching system having a duplicated pair of data handlers which generate duplicated pairs of handling or processing signals for reliability purposes, includes a comparator for determining a mismatch between the signals of any one or more of the pairs of signals to indicate a maintenance problem in the system, a pair of data selectors for supplying one at a time sets of the pairs of signals to be compared to the comparator, and a selection controller for enabling selectively the pair of data selectors, whereby greater flexibility of operation and cost reduction are achieved.

7 Claims, 2 Drawing Figures

DATA HANDLING SYSTEM MAINTENANCE ARRANGEMENT

BACKGROUND OF THE INVENTION

1. Field of the Invention

This invention relates to a data handling system maintenance arrangement, and it more particularly relates to a data handling system maintenance arrangement having a duplicated pair of data handlers for generating duplicated pairs of data handling signals for reliability purposes.

2. Description of the Prior Art

Switching systems have been provided with duplicated pairs of data handlers or processors, which operate in synchronism and perform identical functions simultaneously for the purpose of attaining a high degree of reliability of performance. Since the pair of handlers are identical, for some applications the cost of providing the second handler may be less than the cost of providing additional equipment for checking the output of a single handler. Moreover, by providing a duplicated pair of handlers, intermediate operations of the handlers, as well as the final results, can be monitored and maintenance problems can be detected immediately when they occur so that the problem can be solved and the condition corrected promptly by maintenance equipment without the necessity of having to wait until the handler has completed its non-maintenance functions.

In order to detect a maintenance problem, the pair of data handlers or processors generate duplicated handling or processing signals during the course of their operation, and maintenance equipment monitor selected pairs of the duplicated signals and a comparator continuously compares the signals to detect a disagreement or mismatch between them. In the event of a non-comparison, the maintenance equipment is requested to determine the source of the problem so that the malfunction can be corrected and the handlers returned to their normal operation. However, such a maintenance system has not been entirely satisfactory for some applications, since the comparator, usually exclusive -OR circuitry, has been unduly complex when a large number of signal points are required to be monitored. Thus, it would be highly desirable to have a maintenance system, which has a simplified comparator for checking a large number of pairs of signals, and such a system should provide a high degree of flexibility as to which signal points may be monitored and as to the time at which the comparisons are made.

SUMMARY OF THE INVENTION

The object of this invention is to provide a new and improved data handling system maintenance arrangement for a pair of duplicated data handlers adapted to operate in synchronism in which a simplified comparator is provided to detect a disagreement between signals of any one or more of the duplicated pairs of signals from the handlers.

Another object of the present invention is to provide such a new and improved maintenance system in which pairs of signals may be checked for mismatches in a flexible, efficient and more economical manner.

According to the invention a pair of data selectors each corresponding to one of the duplicated data handlers are provided to supply one at a time sets of the pairs of signals to be compared to the comparator, and a selection controller for enabling selectively the pair of data selectors, whereby for a given number of monitored signals the comparator of the present invention is of a simplified design in that it includes a relatively fewer number of logic gates. In this regard, the comparator employs exclusive -OR circuitry to generate a mismatch signal in response to the signals of any one or more of the pairs of signals being in disagreement, and since the data selector multiplexes the signals to the comparator, a fewer number of logic gates are required. Greater flexibility and reliability are achieved since the signals may be divided into sets of signals which may be compared at the time they are being generated rather than merely monitoring all of the points repeatedly during an entire data processing cycle of operation. In the disclosed embodiment of the present invention, the selection controllers operate sequentially and are controlled by the same timing generators used for the data handlers so that the comparator operates in synchronism with the data handlers.

CROSS-REFERENCES TO RELATED APPLICATIONS

The present invention is incorporated in a data processing system which is disclosed in U.S. Pat. application Ser. No. 201,851, filed Nov. 24, 1971 and now U.S. Pat. No. 3,737,873 by S. E. Puccini for a Data Processor With Cyclic Sequential Access To Multiplexed Logic And Memory, hereinafter referred to as the Register-Sender patent application.

DESCRIPTION OF THE DRAWINGS

The above-mentioned and other objects and features of this invention and the manner of attaining them will become apparent, and the invention itself will be best understood, by reference to the following description of an embodiment of the invention, wherein.

DESCRIPTION OF THE PREFERRED EMBODIMENT

Figure 1:
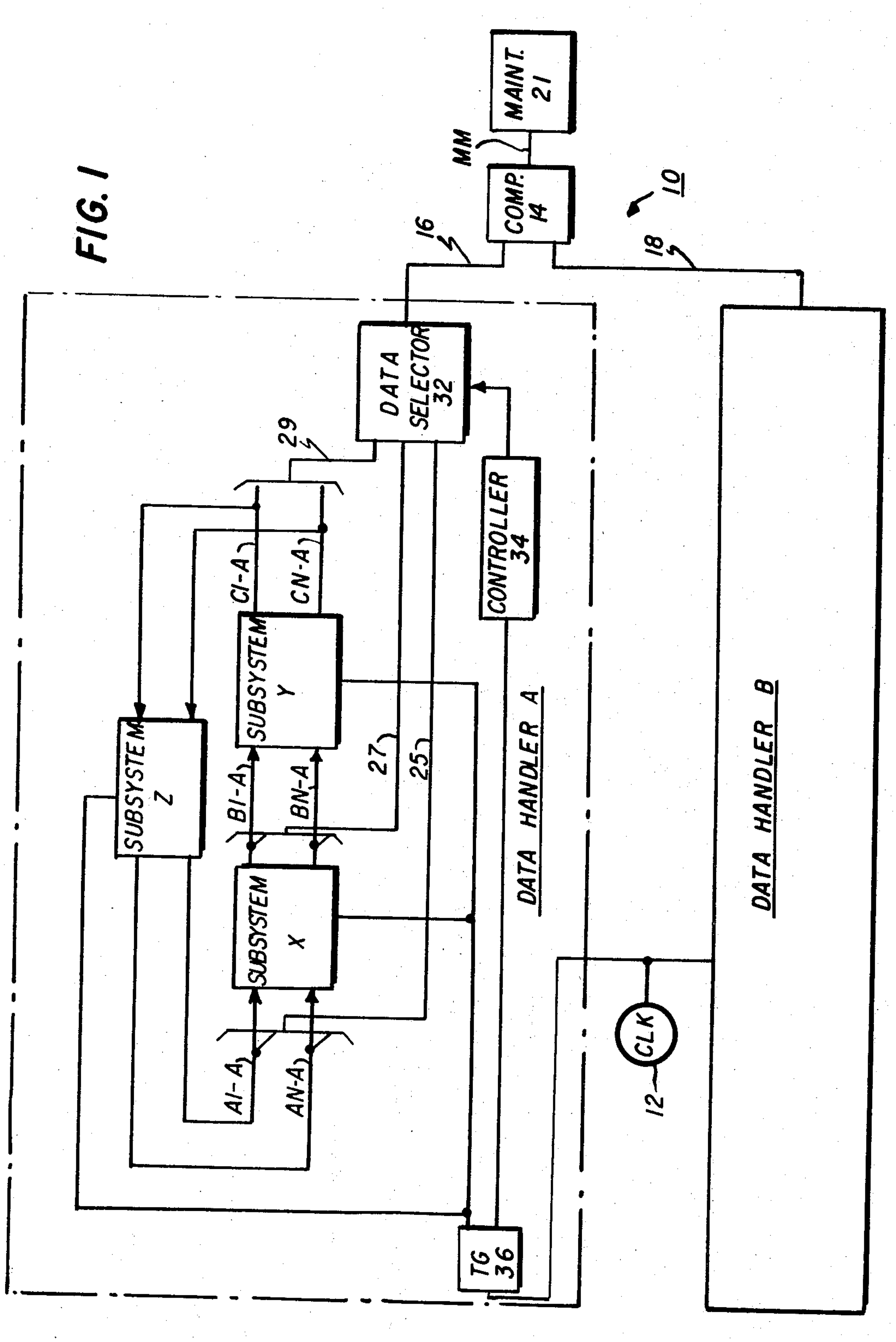
FIG. 1 is a simplified block diagram of a data handling system incorporating the principles of the present invention.

Referring now to the drawings, and more particularly to FIG. 1 thereof, there is shown a data handling system 10 incorporating the principles of the present invention and including a duplicated pair of data handlers A and B which operate in synchronism under the control of a common system clock 12. A comparator 14 receives pairs of processing signals via a pair of cables 16 and 18 from the respective processors A and B to generate a mismatch signal MM which is supplied to a maintenance unit 21, whereby in response to the mismatch signal MM, the maintenance unit 21 initiates suitable diagnostic functions to detect and correct the processing problem which gave rise to the non-comparison.

Considering now the data handlers, the handlers A and B are similar to one another and thus only the handler A need be described. The handler A includes subsystems X, Y and Z connected in a cyclical manner, whereby a set of data handling signals A1-A through AN–A are transferred from subsystem Z to subsystem X, which in turn generates a set of data handling signals B1–A through BN–A and supplies them to subsystem Y from which a set of data handling signals C1–A through CN–A are transmitted to the subsystem Z. The letter "A" at the end of each signal designation identifies the signal as being one which was generated by handler A, it being understood that handler B generates three corresponding sets of signals each having a letter "B" at the end of its designation. It should be also understood that the handler A is shown in simplified form, and that for a detailed description of a system having a duplicated pair of data processors, and which may incorporate the principles of the present invention, reference may be made to the Register-Sender patent application.

In accordance with the present invention, a data selector 32 selectively gates the sets of handling signals received via the cables 25, 27 and 29 from the subsystems to the comparator 14 via the cable 16. A selection controller 34 enables the data selector 32 sequentially, whereby the three sets of signals A1–A to AN–A, B1–A to BN–A, and C1–A to CN–A are sequentially gated through the data selector 32 to the comparator 14 one at a time on a time division multiplex basis. As a result, the circuitry of the comparator 14 is only required to make a comparison between the pairs of sets of signals and not the entire number of signals simultaneously. Moreover, all of the signals as a group need not be monitored repeatedly, since they are individually generated at different times, and thus the sets of signals are compared only at the time when they are being generated during a cycle of operation to provide for efficiency of operation. It should be understood that while the signals are divided into the three sets being generated from the three subsystems, the signals may be divided into sets in any desirable manner and a set may include signals from more than one subsystem. Also, in accordance with the present invention, while three sets of signals are illustrated and described, a smaller or larger number of sets of signals can be compared, if desired.

A timing generator 36 in the data handler A is controlled by the common system clock 12 and in turn generates timing signals for each one of the subsystems and also for the controller 34 so that the controller 34 and the data selector 32 operate in synchronism with the subsystems. Also, the common clock 12 causes the handler B and its data selector (not shown), selection controller (not shown), and timing generator (not shown) to generate in synchronism with the corresponding portions of the handler A so that the duplicated signals of each set are transferred in synchronism to the comparator 14.

Figure 2:
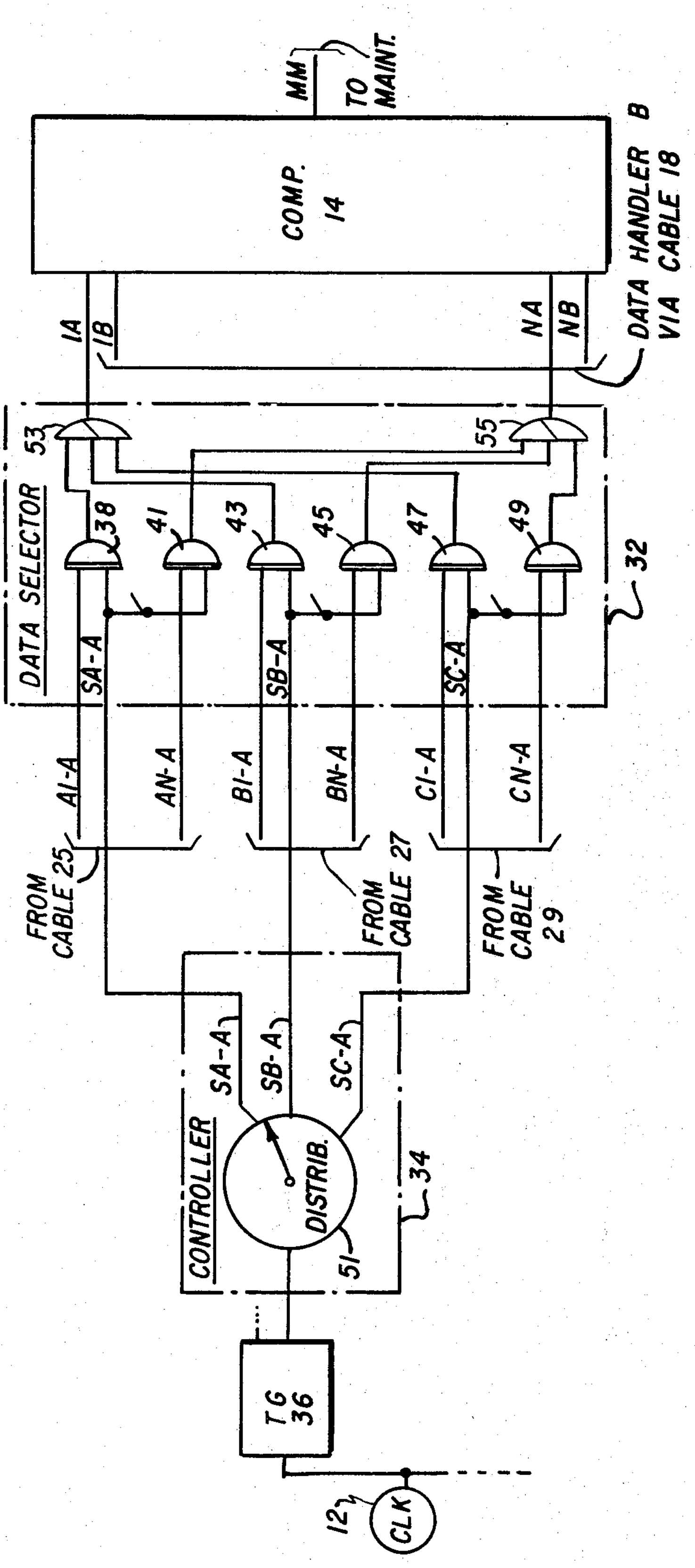
FIG. 2 is a more detailed, functional block diagram of a portion of the system of FIG. 1.

Considering now the data selector 32 and the selection controller 34 in greater detail with reference to FIG. 2 of the drawings, the data selector 32 includes a first set of coincidence AND gates, such as the gates 38 and 41 individually associated with the respective signals S1–A and SN–A, which are each individually associated with one of the sets of signals comprising signals A1–A through AN–A, whereby when the first set of AND gates are enabled, the signals A1–A through AN–A are gated to the comparator 14 for comparison with a corresponding set of signals from data handler B. Similarly, a second set of coincidence AND gates, such as gates 43 and 45, are individually associated with the set of signals comprising the signals B1–A through BN–A, and a third set of coincidence AND gates, such as the gates 47 and 49, are associated with each one of the signals C1–A through CN–A. A timing distributor 51 of the controller 34 generates a pulse train of sequentially, recurring selection signals SA–A, SB–A and SC–A for enabling sequentially the sets of the gates of the data controller 32. The signal SA–A enables all of the gates, including the gates 38 and 41, of the first set simultaneously, and similarly the select signals SB–A and SC–A enable respectively all of the gates of the second set, including the gates 43 and 45, and all of the gates of the third set of AND gates, including the gates 47 and 49. The distributor 51 is advanced sequentially by the timing generator 36, whereby the distributor generates the three select signals in a cyclical manner.

The outputs of the corresponding ones of the AND gates of each one of the three sets of gates are connected together via OR gates, such as the gates 53 and 55, to provide single signal leads for the inputs to the comparator 14. As shown in FIG. 2 of the drawings, for example, the outputs of the first gates 38, 43 and 47 of each of the three sets of gates are connected to the OR gate 53, which has its output connected to an input lead 1A of the comparator 14, and the outputs of the last one of the gates 41, 45 and 49 of the three sets are connected to the OR gate 55, having its output connected to a single input lead NA of the comparator 14. It should be understood that the inputs 1B through NB are connected to corresponding ones of the output leads from the data selector of the processor B.

The comparator 14 includes exclusive -OR logic circuitry for comparing the pairs of signals, and other logic gates to generate the single mismatch signal MM in response to one or more non-comparisons between the signals of one or more of the pairs of signals in the sets thereof. The clock 12 is a source of recurring clock pulses which are used to drive the timing generators of the data processors A and B in synchronism.

What is claimed is:

1. A maintenance arrangement for use with a switching system having maintenance apparatus and a duplicated pair of data handlers operating in synchronism in response to a common source rf recurring clock pulses and each handler including a plurality of subsystems for generating a group of duplicated pairs of handling signals, said groups of signals comprising N number of sets of said pairs of signals, said arrangement comprising:

comparing means for generating a mismatch signal for use by the maintenance apparatus in response to a disagreement between the signals of any one of the pairs of signals;

a pair of first and second data selecting means responsive to the group of duplicated pairs of the handling signals for supplying sets of said signals to be compared one at a time to said comparing means; and first and second control means responsive to said source for enabling selectively said pair of first and second data selecting means respectively to supply said N number of sets of said signals to said comparing means.

2. An arrangement according to claim 1, wherein each one of said data selecting means includes N number of sets of coincidence logic gates responsive to said signals, each one of said control means generating N number of select signals individually associated with each one of said sets of gates of its selecting means for enabling selectively on a one-at-a-time basis said sets of gates.

3. An arrangement according to claim 2, wherein each one of said control means includes a distributor for generating recurring timing signals to serve as said select signals.

4. An arrangement according to claim 3, wherein said N number of sets of logic gates are energized sequentially in response to said timing signals.

5. An arrangement according to claim 4, further including first and second timing generators for controlling the operation of the pair of data handlers and for controlling said distributors, the source of recurrring clock pulses for driving said timing generators in synchronism.

6. An arrangement according to claim 1, wherein said first and second control means includes respective first and second distributors individually associated with one of the pair of data handlers for producing recurring timing signals to serve as select signals for said pair of data selecting means.

7. An arrangement according to claim 6, further including first and second timing generators for controlling the operation of the pair of data handlers and for controlling said distributors, the source of recurring clock pulses for driving said timing generators in synchronism.

* * * * *